United States Patent
Bryant et al.

(10) Patent No.: US 10,087,354 B2
(45) Date of Patent: Oct. 2, 2018

(54) RARE EARTH-CONTAINING COMPOUNDS TO ENHANCE PERFORMANCE OF DOWNHOLE TREATMENT COMPOSITIONS

(71) Applicants: Shannon E. Bryant, Houston, TX (US); Sumit Bhaduri, Spring, TX (US); Terry D. Monroe, Tomball, TX (US)

(72) Inventors: Shannon E. Bryant, Houston, TX (US); Sumit Bhaduri, Spring, TX (US); Terry D. Monroe, Tomball, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 14/918,637

(22) Filed: Oct. 21, 2015

(65) Prior Publication Data
US 2017/0114266 A1 Apr. 27, 2017

(51) Int. Cl.
*C04B 24/10* (2006.01)
*C09K 8/05* (2006.01)
(Continued)

(52) U.S. Cl.
CPC .............. *C09K 8/05* (2013.01); *C04B 22/008* (2013.01); *C04B 22/06* (2013.01); *C04B 28/02* (2013.01); *C09K 8/035* (2013.01); *C09K 8/40* (2013.01); *C09K 8/48* (2013.01); *E21B 21/00* (2013.01); *E21B 21/002* (2013.01); *E21B 33/14* (2013.01); *C09K 2208/12* (2013.01); *C09K 2208/32* (2013.01); *C09K 2208/34* (2013.01)

(58) Field of Classification Search
None
See application file for complete search history.

(56) References Cited

U.S. PATENT DOCUMENTS

| 2004/0000434 A1 | 1/2004 | Todd et al. |
| 2010/0243236 A1* | 9/2010 | Koons ............ C09K 8/40 |
| | | 166/177.4 |

(Continued)

FOREIGN PATENT DOCUMENTS

WO 2014120445 A1 8/2014

OTHER PUBLICATIONS

International Search Report, International Application No. PCT/US2016/057056, dated Jan. 25, 2017, Korean Intellectual Property Office; International Search Report 5 pages.

(Continued)

*Primary Examiner* — Jeffrey Washville
(74) *Attorney, Agent, or Firm* — Cantor Colburn LLP

(57) ABSTRACT

A downhole treatment composition comprises a rare earth-containing compound comprising one or more of the following: scandium; yttrium; lanthanum; cerium; praseodymium; neodymium; promethium; samarium; lutetium; europium; gadolinium; terbium; dysprosium; holmium; erbium; thulium; or ytterbium, wherein the downhole treatment composition is a cement slurry, a drilling fluid, or a spacer fluid. Also disclosed are methods of cementing a wellbore, methods of displacing a first fluid, and methods of drilling a wellbore in a subterranean formation using the cement slurry, the spacer fluid, or the drilling fluid.

14 Claims, 1 Drawing Sheet

(51) Int. Cl.
  *C04B 22/00* (2006.01)
  *C09K 8/40* (2006.01)
  *C09K 8/48* (2006.01)
  *E21B 21/00* (2006.01)
  *E21B 33/14* (2006.01)
  *C09K 8/035* (2006.01)
  *C04B 22/06* (2006.01)
  *C04B 28/02* (2006.01)

(56) References Cited

U.S. PATENT DOCUMENTS

| | | | | |
|---|---|---|---|---|
| 2012/0211227 A1* | 8/2012 | Thaemlitz | ............ | C04B 20/008 166/279 |
| 2013/0098615 A1* | 4/2013 | Perez | .................... | C09K 8/032 166/297 |
| 2013/0109597 A1* | 5/2013 | Sarkar | ..................... | C09K 8/03 507/143 |
| 2014/0158354 A1* | 6/2014 | Kumar | ................. | E21B 21/003 166/293 |

OTHER PUBLICATIONS

Written Opinion of the International Searching Authority, International Application No. PCT/US2016/057056, dated Jan. 25, 2017, Korean Intellectual Property Office; Written Opinion 10 pages.
Zhang et al. "Geochemical characteristics of rare earth elements in petroleum and their responses to mantle-derived fluid:an example from the Dongying Depression, East China", Energy Exploration & Exploitation, vol. 27, No. 1 (2009) pp. 47-68.

* cited by examiner

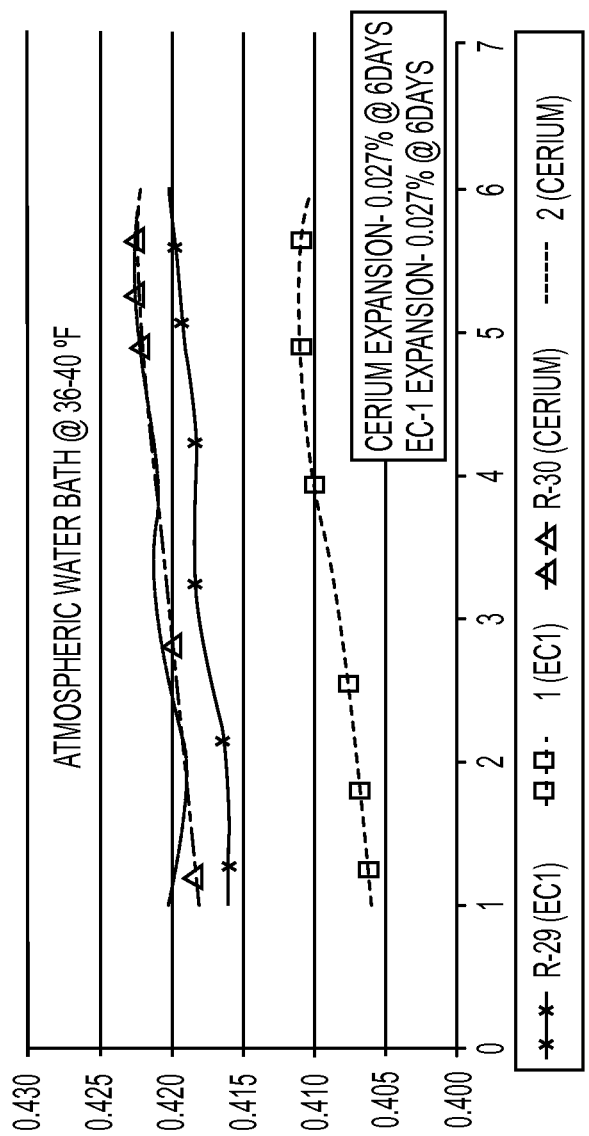

RARE EARTH-CONTAINING COMPOUNDS TO ENHANCE PERFORMANCE OF DOWNHOLE TREATMENT COMPOSITIONS

BACKGROUND

This disclosure relates to downhole treatment compositions containing rare earth-containing compounds and methods of using such compositions in downhole cementing and drilling operations.

Downhole treatment compositions are used for various purposes such as for drilling, cementing, and fluid displacement. Density or mass per unit volume is often a critical property differentiating the effectiveness of various treatment compositions in achieving various functions. For example, density can contribute to the stability of the borehole by increasing the pressure exerted by the drilling fluid onto the surface of the formation. Similarly under these circumstances, controlling the density of cement slurry is important to maintain proper well control through hydrostatic head of the cement column. The hydrostatic head prevents the pressurized fluids in the reservoir from producing uncontrollably into the well. Weighting agents such as barite, calcite, and hematite have been used in the past to adjust the density of drilling fluids and cement slurries. In view of the extensive use of weighting agents in downhole applications, the art would be receptive to cost effective alternative materials. It would be a further advantage if the alternative weighting agents can impart additional mechanical or chemical benefits to the treatment compositions.

BRIEF DESCRIPTION

A method of cementing a wellbore comprises injecting into the wellbore a cement slurry comprising a rare earth-containing compound, an aqueous carrier, and a cement component; and allowing the slurry to set.

A method of displacing a first fluid from a wellbore comprises injecting the first fluid into the wellbore; and displacing the first fluid with a spacer fluid, the spacer fluid comprising: a carrier, a rare earth-containing compound as a weighting agent, and an additive comprising one or more of the following: a viscosifier; a surfactant; a weighting agent other than the rare earth-containing compound; a lubricant; a fluid loss agent; a clay stabilizer; a biocide; an acid; a corrosion inhibitor; or an oxygen scavenger.

A method of drilling a wellbore in a subterranean formation comprises circulating a drilling fluid in the subterranean formation; the drilling fluid comprising a rare earth-containing compound.

A downhole treatment composition comprises a rare earth-containing compound, wherein the treatment composition is a cement slurry, a drilling fluid, or a spacer fluid.

In the methods and compositions disclosed herein, the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

BRIEF DESCRIPTION OF THE DRAWINGS

The FIGURE shows the percentage of cement expansion at atmospheric pressure as a function of curing time for formulations containing EC1 and cesium (IV) oxide respectively.

DETAILED DESCRIPTION

It has been found that rare earth-containing compounds described herein impart desirable properties to a variety of downhole treatment compositions such as cement slurries, drilling fluids, or spacer fluids. The desirable properties include a high specific gravity allowing less material to be used to achieve a given density and the creation of a higher ultimate density. The rare earth-containing compounds also have the capacity to volumetrically expand, which can reduce microannulus issues and control gas migration and shallow water flow. Advantageously, the rare earth-containing compounds have beneficial effects on one or more of the mechanical properties including compressive strength, tensile strength, Young's modulus, Poisson's ration, and shear bond strength.

In an embodiment, disclosed herein is a downhole treatment composition comprising a rare earth-containing compound. The rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium, preferably the rare earth-containing compound comprises cerium or lanthanum.

The rare earth-containing compound is present in the form of oxides, halides, hydroxides, carbonates, sulfates, nitrates, acetates, or a combination comprising at least one of the foregoing. In an embodiment, the rare earth-containing compound comprises one or more of the following: cerium oxide; cerium chloride; cerium bromide; cerium hydroxide; cerium carbonate; cerium sulfate; cerium nitrate; cerium ammonium nitrate; or cerium acetate. Cerium oxide, cerium hydroxide (also referred to as cerium hydrate), and cerium chloride are specifically mentioned. The composition can include two or more rare earth-containing compounds. Such compounds can contain the same or different rare earth elements and can contain mixed valence or oxidation states. By way of example, when the rare earth-containing compound comprises a cerium oxide, the compound can comprise one or more cerium oxides such as $CeO_2$ (IV) and $Ce_2O_3$ (III). The rare earth containing compound has a specific gravity of about 5 to about 10 or about 5 to about 8.

In an embodiment, the downhole treatment composition is a cement slurry comprising an aqueous carrier, a cement component, and the rare earth-containing compound.

The aqueous carrier is present in the cement slurries in an amount of about 10% to about 60% by weight, more preferably in an amount of about 20% to about 40% by weight, based on the total weight of the cement slurry. The aqueous carrier fluid can be fresh water, brine (including seawater), an aqueous base, or a combination comprising at least one of the foregoing.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as 11.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The NaCl salt can be present in the brine in an amount of about 0.5 to about 25 weight percent (wt. %), specifically about 1 to about 15 wt. %, and more specifically about 3 to about 10 wt %, based on the weight of the carrier.

The cement component of the cement slurry can be any cementitious material that sets and hardens by reaction with water, and is suitable for forming a set cement downhole, including mortars and concretes. Suitable cement components include those typically employed in a wellbore environment, for example those comprising calcium, aluminum, silicon, oxygen, and/or sulfur. Such cements include, but are not limited to, Portland cements, pozzolan cements, gypsum cements, high alumina content cements, silica cements, and high alkalinity cements, or combinations of these. Portland cements are particularly useful. In some embodiments, the Portland cements that are suited for use are classified as Class A, B, C, G, and H cements according to American Petroleum Institute, API Specification for Materials and Testing for Well Cements, and ASTM Portland cements classified as Type I, II, III, IV, and V. The cements herein also can include various concretes by the further addition of aggregates, such as a coarse aggregate made of gravel or crushed rocks such as chert, quartzite, granite, and/or a fine aggregate such as sand or crushed sand. Aggregate can be added in an amount of about 10% to about 70% by weight of the hydraulic cement, and more particularly about 20% to about 40% by weight.

The cement component can be present in the slurry in an amount of about 50 to about 95 wt. %, preferably about 60 to about 90 wt. %, more preferably about 65 to about 85 wt. %, based on the total weight of the cement slurry.

The rare earth-containing compound is present in the slurry in an amount of greater than zero percent and less than about 50 wt. %, greater than about 5 wt % and less than about 50 wt. %, greater than about 10 wt. % and less than about 50 wt. %, greater than about 5 wt % to less than about 40 wt %, or greater than about 10 wt. % to about less than about 30 wt. %, based on the total weight of the cement slurry.

The cement slurries can further comprise other components known for use in cementing, for example a setting accelerator to reduce setting time, a setting retardant to extend setting time, a fluid loss control agent, an extender to lower density, a foaming agent to reduce density, a weighting agent to increase density, a dispersant to reduce viscosity, other fluid loss control agents, thixotropic agents, a bridging agent or lost circulation material (e.g., gilsonite or cellophane flakes), silicate materials such as sand, silica flour, fumed silica, act to strengthen cement as well as protect from strength retrogression effects at temperatures above 230° F., clay stabilizers, or a combination comprising at least one of the foregoing. These additive components are selected to avoid imparting unfavorable characteristics to the cement slurries, and to avoid damaging the wellbore or subterranean formation. Each additive can be present in amounts generally known to those of skill in the art.

Setting accelerators include compounds such as triethanolamines, calcium chloride, potassium chloride, sodium chloride, sodium formate, sodium nitrate, and other alkali and alkaline earth metal halides, formates, nitrates, and sulfates.

Setting retardants include compounds such as such as hydroxycarboxylic acids and their salts, such as sodium tartrate, sodium citrate, sodium gluconate, sodium itaconate, tartaric acid, citric acid, and gluconic acid, lignosulfonates, saccharides, polysaccharides, organophosphates such as $C_{2-12}$ alkylene phosphonic acids, salts such as sodium chloride, and oxides of zinc and lead, and the like.

Extenders include low density aggregates, clays such as hydrous aluminum silicates (e.g., bentonite (85% mineral clay smectite), pozzolan (finely ground pumice of fly ash), diatomaceous earth, silica, e.g., a quartz and condensed silica fumed silica, expanded Pearlite, gilsonite, powdered coal, and the like.

The aqueous carrier fluid of the slurry can be foamed with a liquid hydrocarbon or a gas or liquefied gas such as nitrogen, or air. The fluid can further be foamed by inclusion of a non-gaseous foaming agent. The non-gaseous foaming agent can be amphoteric, cationic, or anionic. Suitable amphoteric foaming agents include alkyl betaines, alkyl sultaines, and alkyl carboxylates. Suitable anionic foaming agents can include alkyl ether sulfates, ethoxylated ether sulfates, phosphate esters, alkyl ether phosphates, ethoxylated alcohol phosphate esters, alkyl sulfates, and alpha olefin sulfonates. Suitable cationic foaming agents can include alkyl quaternary ammonium salts, alkyl benzyl quaternary ammonium salts, and alkyl amido amine quaternary ammonium salts. A foam system is mainly used in low pressure or water sensitive formations. A mixture of foaming and foam stabilizing dispersants can be used. Generally, the mixture can be included in the cement slurries in an amount of about 1% to about 5% by volume of water in the cement slurry.

Weighting agents are high-specific gravity and finely divided solid materials used to increase density. The rare earth-containing compound can be the only weighting agents present in a cement slurry. Alternatively, the rare earth-containing compounds can be used together with other weighting agents such as silica flour, fly ash, calcium carbonate, barite, hematite, ilmenite, siderite, and the like.

Examples of suitable dispersants include but are not limited to naphthalene sulfonate formaldehyde condensates, acetone formaldehyde sulfite condensates, and glucan delta lactone derivatives. Other dispersants can also be used depending on the application of interest.

Fluid loss control agents can be present, for example a latex, latex copolymers, nonionic, water-soluble synthetic polymers and copolymers, such as guar gums and their derivatives, poly(ethyleneimine), cellulose derivatives, and polystyrene sulfonate.

Clay stabilizers prevent a clay from swelling downhole upon contact with the water or applied fracturing pressure and can be, for example, a quaternary amine, a brine (e.g., KCl brine), choline chloride, tetramethyl ammonium chloride, or the like. Clay stabilizers also include various salts such as NaCl, $CaCl_2$, and KCl, which also act at low concentrations to generally accelerate the set time associated with a cement slurry.

The slurry is pumpable. A pumpable cement slurry can have a viscosity lower than 1000 mPa-s at a shear rate of 100 $s^{-1}$. The cement slurry is a low-density cement slurry or a high-density cement slurry. While the density of a low-density cement slurry such as a scavenger can vary widely depending on downhole conditions, such densities can include about 5 to about 12 pounds per gallon (ppg) when foamed. When unfoamed the density of a scavenger or low-density cement slurry can vary with such densities between about 9 up to about 15 pounds per gallon, or about 10 to about 14 pounds per gallons, or about 11 up to about 13 pounds per gallon. The high density cement slurries can have a density of about 15 to about 25 pounds per gallon.

In another embodiment, the treatment composition is a spacer fluid, where the rare earth-containing compound is present in an amount effective to achieve a density of 8.5 to 24, 10 to 22, or 15 to 19. For example, the rare earth-containing compound can be present in an amount of 2.2% to 77%, 19% to 73%, or 52% to 66%, based on the total weight of the spacer fluid.

The spacer fluid can further comprise other components known for use in spacer fluids, for example a viscosifier, a surfactant, a weighting agent other than the rare earth-containing compound, a lubricant, a fluid loss agent, a clay stabilizer, a biocide, an acid, a corrosion inhibitor, an oxygen scavenger, or a combination comprising at least one of the foregoing. The viscosifier is specifically mentioned. These additional components are selected so as to avoid imparting unfavorable characteristics to the spacer fluid, to avoid damage to equipment in contact with the spacer fluid, and to avoid damaging the wellbore or subterranean formation.

The viscosifier can be a natural polymers such as guar gums, guar derivatives such as hydropropyl guar (HPG), carboxymethyl guar (CMG), and carboxymethylhydroxypropyl guar (CMHPG), high-molecular weight, hydratable polysaccharides, xanthan gum (which can optionally be crosslinked), galactomannan gums, glucomannan gums, cellulose, cellulose derivatives such as hydroxyethylcellulose (HEC), carboxymethylcellulose (CMC), hydroxypropylcellulose (HPC), and carboxymethylhydroxyethylcellulose (CMHEC); synthetic polymers such as poly((meth)acrylic acid)s, poly((meth)acrylamides), copolymers of (meth) acrylic acid and (meth)acrylamide, and C1-8 alkyl poly (meth)acrylates; or clays such as bentonite, sepiolite, and attapulgite, and the like; or a combination comprising at least one of the foregoing viscosifiers.

Surfactants can increase the compatibility of the spacer fluid and the drilling fluid and/or cement slurry. The surfactant can be anionic, cationic, zwitterionic, or non-ionic. Other useful surfactants include those having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones.

Lubricants minimize friction and include materials such as a polyacrylamide, petroleum distillate, hydrotreated light petroleum distillate, a short chain alcohol (e.g., methanol), or polyol (e.g., ethylene glycol or glycerol polyisobutyl methacrylate, polymethyl methacrylate, polyisobutylene, guar, guar derivatives, a polysaccharide such as cellulose and starch, and polyethylene oxide, or a combination comprising at least one of the foregoing can be used.

Fluid-loss control agents are usually water-soluble polymers such as guar gums, poly(ethyleneimine, cellulose derivatives, and polystyrene sulfonate. In some embodiments the same polymer functions as both a viscosifier and a fluid-loss control agent.

The clay stabilizer and the weighting agent other than the rare earth-containing compounds can be the same as those used for cement slurries.

A biocide prevents injection of a microbe (e.g., bacteria) downhole by eliminating or reducing bacteria in the segregating fluid, thus reducing production of, e.g., sour gas. Examples of biocides include aldehydes such as glutaraldehyde, oxidizing biocides such as hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, trichloroisocyanuric acids, dichloroisocyanuric acids, chlorinated hydantoins, and the like, stabilized sodium hypobromite, activated sodium bromide, brominated hydantoins, chlorine dioxide, ozone, inorganic persulfates such as ammonium persulfate, or peroxides, such as hydrogen peroxide, and organic peroxides, and non-oxidizing biocides such as dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl) phosphonium sulfate, glutaraldehyde, alkyldimethylbenzyl ammonium chloride, didecyldimethylammonium chloride, poly[oxyethylene-(dimethyliminio) ethylene (dimethyliminio) ethylene dichloride], decylthioethanamine, terbuthylazine, quaternary ammonium salts (e.g., having a fatty alkyl group and three methyl groups), and quaternary phosphonium salts having methyl groups, hydroxymethyl groups or aryl groups. Specific examples of biocides include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride.3,5,7-triaza-1-azoniaadamantane, or a combination comprising at least one of the foregoing can be used. In an embodiment, the biocide is encapsulated or coated.

The carrier for the spacer fluid can be the same as the carrier for the cement slurries. It can be foamed in a similar way as the carrier fluid for the cement slurries.

The various properties of the spacer fluids can be varied and can be adjusted according to well control and compatibility parameters of the particular drilling fluid, cement slurry, or other fluid being segregated. For example, the viscosity of the spacer fluid can be varied over a wide range such as an apparent viscosity (AV) from about 0.9 to about 200 centiPoise (cP).

The density of the spacer fluid can vary over a wide range. In an embodiment, the spacer fluid is heavier (denser) than the preceding fluid (e.g., a 12 ppg drilling fluid and then a 14 ppg spacer and then a 16 ppg cement).

In an embodiment, the treatment composition is a drilling fluid wherein the rare earth-containing compound is present in an amount of about 2.2% to about 77%, about 19% to about 73%, or about 52% to about 66%, based on the total weight of the composition.

Rare earth-containing compound can be used in oil based drilling fluids or water based drilling fluids. In oil based fluids, solid particles are suspended in oil, and water or brine may be emulsified with the oil. The oil is typically the continuous phase. In water based fluids, solid particles are suspended in water or brine, and oil may be emulsified in the water. The water is typically the continuous phase.

Known additives typically used in the drilling fluids include but are not limited to clay, viscosifiers, defoamers, fluid loss agents, bentonite, and potassium formate.

The downhole compositions can be used in various applications. In an embodiment, the cement slurry is used to form downhole components, including various casings, seals, plugs, packings, liners, and the like.

A pumpable or pourable cement slurry can be formed by any suitable method. In an exemplary embodiment, a slurry or mixture comprising the rare earth-containing compound, the cement component, and water or the aqueous carrier is combined using conventional cement mixing equipment. The cement slurry can then be injected, e.g., pumped and placed by various conventional cement pumps and tools to any desired location within the wellbore to fill any desired shape form. Once the cement slurry has been placed and assumed the shape form of the desired downhole article, the slurry is allowed to set and form a permanent shape of the base cement article, for example a casing or cement plug.

The method is particular useful for cementing a wellbore, which includes injecting, generally pumping, into the wellbore the cement slurry containing the rare earth-containing compound at a pressure sufficient to displace a drilling fluid, for example a drilling mud, a cement spacer, or the like, optionally with a "lead slurry" or a "tail slurry". The cement slurry can be introduced between a penetrable/rupturable bottom plug and a solid top plug. Once placed, the cement slurry is allowed to harden, and in some embodiments, forms a cement plug in the wellbore annulus, which prevents the flow of reservoir fluids between two or more permeable geologic formations that exist with unequal reservoir pressures. Usually, the slurry hardens by hydration and gelation of the cement. As is known by those of skill in the art, a high degree of variability exists in the above description of well cementation (e.g., multiple bottom plugs, graduated fluid densities, etc.), and can be effected using preformed synthetic polymers described herein.

The spacer fluid can be used to displace another fluid in a wellbore. Accordingly, a method of displacing a first fluid from a wellbore comprises injecting the first fluid into the wellbore; and displacing the first fluid with a spacer fluid. The spacer fluids can also be utilized as a buffer between two fluids during subterranean operations. For example, in some embodiments, the spacer fluid is pumped into a wellbore between a first fluid and a second fluid. The first fluid is displaced with the spacer fluid, and the spacer fluid is then displaced with the second fluid. Among other things, the spacer fluids is compatible with the fluid that it is displacing and the second fluid that is displacing the spacer fluid, in that there are no undesirable interactions between the spacer fluid and the first or the second fluid. Generally, the first fluid may be any fluid that the spacer fluid should displace, such as drilling fluids. The second fluid may be any fluid desired to be introduced into the well bore, such as cement slurries and the like.

A method of drilling a wellbore in a subterranean formation comprises circulating a drilling fluid in the subterranean formation. The circulation path of the drilling fluid typically extends from the drilling rig down through the drill pipe string to the bit face and back up through the annular space between the drill pipe string and wellbore face to the wellhead and/or riser, returning to the rig. The drilling fluid performs a number of functions as it circulates through the wellbore including cooling and lubricating the drill bit, removing drill cuttings from the wellbore, aiding in support of the drill pipe and drill bit, and providing a hydrostatic head to maintain the integrity of the wellbore walls and prevent well blowouts. The drilling fluid also desirably prevents sloughing and wellbore cave-ins when drilling through water sensitive formations.

The beneficial effects of using rare earth-containing compounds in downhole treatment compositions are further illustrated in the following examples.

EXAMPLES

Weighting Agent

As shown in Table 1, the cerium (IV) oxide used for testing has a specific gravity of 7.2, which is almost twice as heavy as Hematite (ferric oxide) or W-10 (manganese oxide) or Barite (barium sulfate). Accordingly, it requires 20% less cerium (IV) oxide to achieve the same slurry density as these other weighting agents with similar water requirements.

Higher densities are achievable while maintaining similar requirements with weights up to 25 ppg, as compared to 20 ppg recommended for W-10 and 22 ppg recommended for Hematite.

Two samples were prepared for setting studies. Sample A contained Joppa H cement, 33% of w-10a, 0.02 gps FP-12L (anti-foamer available from Baker Hughes Inc.) and 4.3 gps tap water and has a density of 18.5 ppg. Sample B contained Sample B contained Joppa H, 26% of w-10a, 0.02 gps FP-12L and 4.3 gps tap water and has a density of 18.5 ppg. The setting tests were conducted using 70 F water bath for 24 hours. The results are summarized in Table 2. As shown in Table 2, cerium (IV) oxide has slightly better suspension than W-10a when mixed at 18.5 ppg and tested in a settling tube.

TABLE 1

| | Cerium (IV) oxide | Hematite | W-10a | Barite |
|---|---|---|---|---|
| Sg | 7.25 | 5.02 | 4.79 | 4.23 |
| Abs vol. | 0.1378 | 0.0239 | 0.025 | 0.0283 |

TABLE 2

| | Top | $2^{nd}$ | $3^{rd}$ | $4^{th}$ | $5^{th}$ | Bottom | Difference |
|---|---|---|---|---|---|---|---|
| W-10a | 18.43 | 18.93 | 18.93 | 18.93 | 19.02 | 19.02 | 0.6 |
| Cerium (IV) oxide | 18.77 | 18.85 | 18.85 | 18.85 | 18.82 | 18.93 | 0.16 |

Expansion Capacity

Expansion tests were conducted in a water bath using expansion rings. The results are shown in Tables 3 and 4 as well as the FIGURE of the disclosure.

TABLE 3

| Joppa H + 2% EC1 or Cerium oxide + 0.02 gps FP-12L + 39% tap water mixed @ 16.4 ppg | | | | | | |
|---|---|---|---|---|---|---|
| | Initial | 18 hrs | 24 hrs | 48 hrs | 72 hrs | 6 days |
| 1 (EC1) | 0.416 | 0.416 | 0.418 | 0.418 | 0.419 | 0.420 |
| 2 (EC1) | 0.406 | 0.407 | 0.408 | 0.410 | 0.411 | 0.410 |
| 1 (Cerium IV oxide) | 0.418 | 0.419 | 0.420 | 0.421 | 0.422 | 0.422 |
| 2 (Cerium IV oxide) | 0.420 | 0.419 | 0.421 | 0.421 | 0.422 | 0.422 |
| Temperature (F.) | 41.2 | 35.8 | 35.6 | 39.8 | 42.30 | 37.2 |

TABLE 4

Cerium Chloride as a Liquid Expanding Additive for Cement
% Expansion measured in Expansion Ring Mold

|  | Joppa H Cement @ 16.4 ppg w/no expanding additive | Dyk. G Cement @ 15.8 ppg w/2.5% EC-1 | Joppa H Cement @ 16.4 ppg w/2.5 EC-1 | Joppa H Cement @ 16.4 ppg w/0.1 gps CeCl$_3$ | Joppa H Cement @ 16.4 ppg w/0.2 gps CeCl$_3$ |
|---|---|---|---|---|---|
| Room Temp. & 3,000 psi | (+) 0.05% | — | (+) 0.17% | (+) 0.24% | (+) 0.20% |
| 250° F. & 3,000 psi | — | (+) 0.11% | (+) 0.12% |  | (+) 0.16% |

As shown in Tables 3, 4 and the FIGURE, cerium (IV) oxide and cerium (III) chloride had similar expansion capabilities compared to EC-1 (an expanding additive for cement available from Baker Hughes Inc.).

Further included in this disclosure are the following specific embodiments, which do not necessarily limit the claims.

Embodiment 1

A method of cementing a wellbore, the method comprising injecting into the wellbore a cement slurry comprising a rare earth-containing compound, an aqueous carrier, and a cement component; and allowing the slurry to set, wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

Embodiment 2

The method of Embodiment 1, wherein the rare earth-containing compound comprises at least one of cerium and lanthanum.

Embodiment 3

The method of Embodiment 2, wherein the rare earth-containing compound comprises one or more of the following: cerium oxide; cerium chloride; cerium bromide; cerium hydroxide (hydrate); cerium carbonate; cerium sulfate; cerium nitrate; cerium ammonium nitrate; or cerium acetate.

Embodiment 4

The method of any one of Embodiments 1 to 3, wherein the cement slurry comprises greater than zero and less than about 50 wt % of the rare earth-containing compound, based on the total weight of the cement slurry.

Embodiment 5

A method of displacing a first fluid from a wellbore, the method comprising injecting the first fluid into the wellbore; and displacing the first fluid with a spacer fluid, the spacer fluid comprising: a carrier, a rare earth-containing compound as a weighting agent, and an additive comprising one or more of the following: a viscosifier; a surfactant; a weighting agent other than the rare earth-containing compound; a lubricant; a fluid loss agent; a clay stabilizer; a biocide; an acid; a corrosion inhibitor; or an oxygen scavenger; wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

Embodiment 6

The method of Embodiment 5, wherein the first fluid comprises a drilling fluid.

Embodiment 7

The method of Embodiment 5 or Embodiment 6, further comprising displacing the spacer fluid with a second fluid.

Embodiment 8

The method of Embodiment 7, wherein the second fluid is a cement slurry.

Embodiment 9

The method of any one of Embodiments 5 to 8, wherein the rare earth-containing compound comprises at least one of cerium and lanthanum.

Embodiment 10

The method of any one of Embodiments 5 to 9, wherein the rare earth-containing compound comprises one or more of the following: cerium oxide; cerium chloride; cerium bromide; cerium hydroxide (hydrate); cerium carbonate; cerium sulfate; cerium nitrate; cerium ammonium nitrate; or cerium acetate.

Embodiment 11

The method of any one of Embodiments 5 to 10, wherein the spacer fluid comprises greater than zero and less than about 77 wt % of the rare earth-containing compound, based on the total weight of the spacer fluid.

Embodiment 12

A method of drilling a wellbore in a subterranean formation, the method comprising: circulating a drilling fluid in the subterranean formation; the drilling fluid comprising a rare earth-containing compound; wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

Embodiment 13

The method of Embodiment 12, wherein the rare earth-containing compound comprises at least one of cerium and lanthanum.

Embodiment 14

The method of Embodiment 12 or Embodiment 13, wherein the rare earth-containing compound comprises one or more of the following: cerium oxide; cerium chloride;

cerium bromide; cerium hydroxide; cerium carbonate; cerium sulfate; cerium nitrate; cerium ammonium nitrate; or cerium acetate.

Embodiment 15

The method of any one of Embodiments 12 to 14, wherein the drilling fluid comprises greater than zero and less than about 77 wt % of the rare earth-containing compound, based on the total weight of the drilling fluid.

Embodiment 16

A downhole treatment composition comprising a rare earth-containing compound comprising one or more of the following: scandium; yttrium; lanthanum; cerium; praseodymium; neodymium; promethium; samarium; lutetium; europium; gadolinium; terbium; dysprosium; holmium; erbium; thulium; or ytterbium; wherein the downhole treatment composition is a cement slurry, a drilling fluid, or a spacer fluid.

Embodiment 17

The downhole treatment composition of Embodiment 16, wherein the downhole treatment composition is a cement slurry comprising greater than zero and less than about 50 wt. % of a compound comprising at least one of cerium or lanthanum.

Embodiment 18

The downhole treatment composition of Embodiment 16, wherein the downhole treatment composition is a spacer fluid comprising a carrier; 2% to 77% of a compound comprising at least one of cerium and lanthanum as a weighting agent; and an additive comprising one or more of the following: a viscosifier; a surfactant; a weighting agent other than the rare earth-containing compound; a lubricant; a fluid loss agent; a clay stabilizer; a biocide; an acid; a corrosion inhibitor; or an oxygen scavenger.

Embodiment 19

The downhole treatment composition of Embodiment 16, wherein the downhole treatment composition is a drilling fluid comprising 2% to 77% of a compound comprising cerium, lanthanum, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs. As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method of cementing a wellbore, the method comprising
   injecting into the wellbore a cement slurry comprising greater than about 10 wt % to less than about 30 wt % of a rare earth-containing compound based on the total weight of the cement slurry, an aqueous carrier, and a cement component that sets and hardens by reaction with water; and
   allowing the slurry to set,
   wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium; and the rare earth-containing compound is a halide, carbonate, sulfate, nitrate, acetate, or a combination comprising at least one of the foregoing.

2. The method of claim 1, wherein the rare earth-containing compound comprises at least one of a cerium-containing compound, and a lanthanum-containing compound.

3. The method of claim 2, wherein the rare earth-containing compound comprises one or more of the following: cerium chloride; cerium bromide; cerium carbonate; cerium sulfate; cerium nitrate; cerium ammonium nitrate; or cerium acetate.

4. The method of claim 1, wherein the rare earth-containing compound is present in the form of halides.

5. The method of claim 1, wherein the rare earth-containing compound comprising both the cerium-containing compound and the lanthanum-containing compound.

6. The method of claim 5, wherein the cerium-containing compound comprises one or more of the following: cerium chloride; cerium bromide; cerium carbonate; cerium sulfate; cerium nitrate; cerium ammonium nitrate; or cerium acetate.

7. The method of claim 1, wherein the rare earth-containing compound has a specific gravity of about 5 to about 10.

8. The method of claim 1, wherein the rare earth-containing compound has a specific gravity of about 5 to about 8.

9. The method of claim 1, wherein the aqueous carrier is present in the cement slurry in an amount of about 10% to about 60% by weight, based on the total weight of the cement slurry.

10. The method of claim 2, wherein the cerium-containing compound comprises cerium chloride.

11. The method of claim 2, wherein the lanthanum-containing compound is present in the form of halides, hydroxides, or a combination comprising at least one of the foregoing.

12. The method of claim 5, wherein the cerium-containing compound comprises or cerium chloride.

13. The method of claim 5, wherein the lanthanum-containing compound is present in the form of halides, hydroxides, or a combination comprising at least one of the foregoing.

14. The method of claim 1, wherein the cement component comprises Portland cements, pozzolan cements, gypsum cements, high alumina content cements, silica cements, high alkalinity cements, or a combination comprising at least one of the foregoing.

\* \* \* \* \*